Sept. 21, 1965                H. H. HANSEN                3,208,025
                      ROTARY CURRENT TRANSFER DEVICE
Filed July 10, 1962                                    2 Sheets-Sheet 1

INVENTOR.
HANS H. HANSEN
BY
*Francis J. Klempay*
ATTORNEY

United States Patent Office 3,208,025
Patented Sept. 21, 1965

3,208,025
ROTARY CURRENT TRANSFER DEVICE
Hans H. Hansen, Cortland, Ohio, assignor to The Taylor-Winfield Corporation, Warren, Ohio, a corporation of Ohio
Filed July 10, 1962, Ser. No. 208,883
8 Claims. (Cl. 339—5)

This invention relates to apparatus for transferring heavy electric currents between stationary and rotating parts. Such apparatus is widely used in electric resistance seam welders, for example, wherein a rotating current-conductive spindle mounts a wheel electrode and wherein the wheel electrode conducts welding current and supplies welding force or pressure, all as is well understood in the resistance welding art. The preferred method of conducting the welding current to such rotary electrode is through a cartridge-type of current-conductive sleeve in which the spindle rotates, there being suitable parts in the form of brushes or rolling contacts positioned in the annular space between the sleeve and the spindle to conduct the current from the sleeve to the spindle or vice versa.

In most seam welding equipment and in certain other applications it is desirable to keep the frictional resistance to rotation of the spindle fairly low to prevent sliding of the periphery of the rotary electrode on the work and for other purposes. This requirement is at odds with the requirement that the rotating joint be capable of efficiently translating currents of very high amperage without excess heating (loss of current), arcing, pitting, or undue wear. Generally, the use of spring pressed brushes or other sliding contacts has not proven very satisfactory because of excess friction and wear and because of the acceleration of arcing and pitting when irregularities develop in the rotating surface of the spindle. Accordingly, a number of prior art devices have proposed the use of a multiplicity of high current-conductive needle-like rollers positioned between a peripheral surface of the spindle and a relatively fixed current-conductive member or members which are yieldingly urged toward the axis of rotation of the spindle. These needle-like rollers are commonly formed of a silver alloy for low electrical resistance but it will be understood that each roller contacts both the fixed member or members and the peripheral surface of the spindle only along fairly narrow lines so that the aggregate linear length of contact of all the rollers must be very substantial if heavy currents of the order of twenty or thirty thousand amps is to be transferred. A problem heretofore encountered in connection with the use of these needle-like rollers is that minute inaccuracies in manufacture or alignment or the development of slight irregularities through wear in the cylindrical peripheral surface of the spindle result in erratic breaking of the linear contacts with the resultant arcing and pitting and overloading of other current paths beyond acceptable current densities.

The primary object of the present invention is to provide improved means for pressure loading the current-conductive needle-like rollers positioned between the rotating spindle and fixed parts of the rotary joint whereby each needle will be kept in pressurized rolling linear contact with the spindle and with the fixed parts throughout the whole of its length. In this manner the aggregate pressurized linear engagement is maintained at the maximum possible value under all normal conditions of inaccuracy in manufacture and of wear so that the device may be operated continuously and over long periods of service at its maximum rated capacity. Further, the operation of the apparatus of this invention is such that the pressure loading between the fixed and rotating parts is evenly distributed to thereby maintain the frictional resistance to rotation of the spindle to the minimum required for the current transfer. In other words, there is no localized force overloading of the rollers to cause the same to flatten or to enter into minute depressions in the contacting surfaces of the fixed and rotating parts which, it will be understood, is the principal source of friction (i.e., resistance to rotation) in devices of this kind.

The above and other objects and advantages of the invention will become apparent upon consideration of the following specification and the accompanying drawing wherein there is disclosed a preferred embodiment of the invention.

Figure 1:
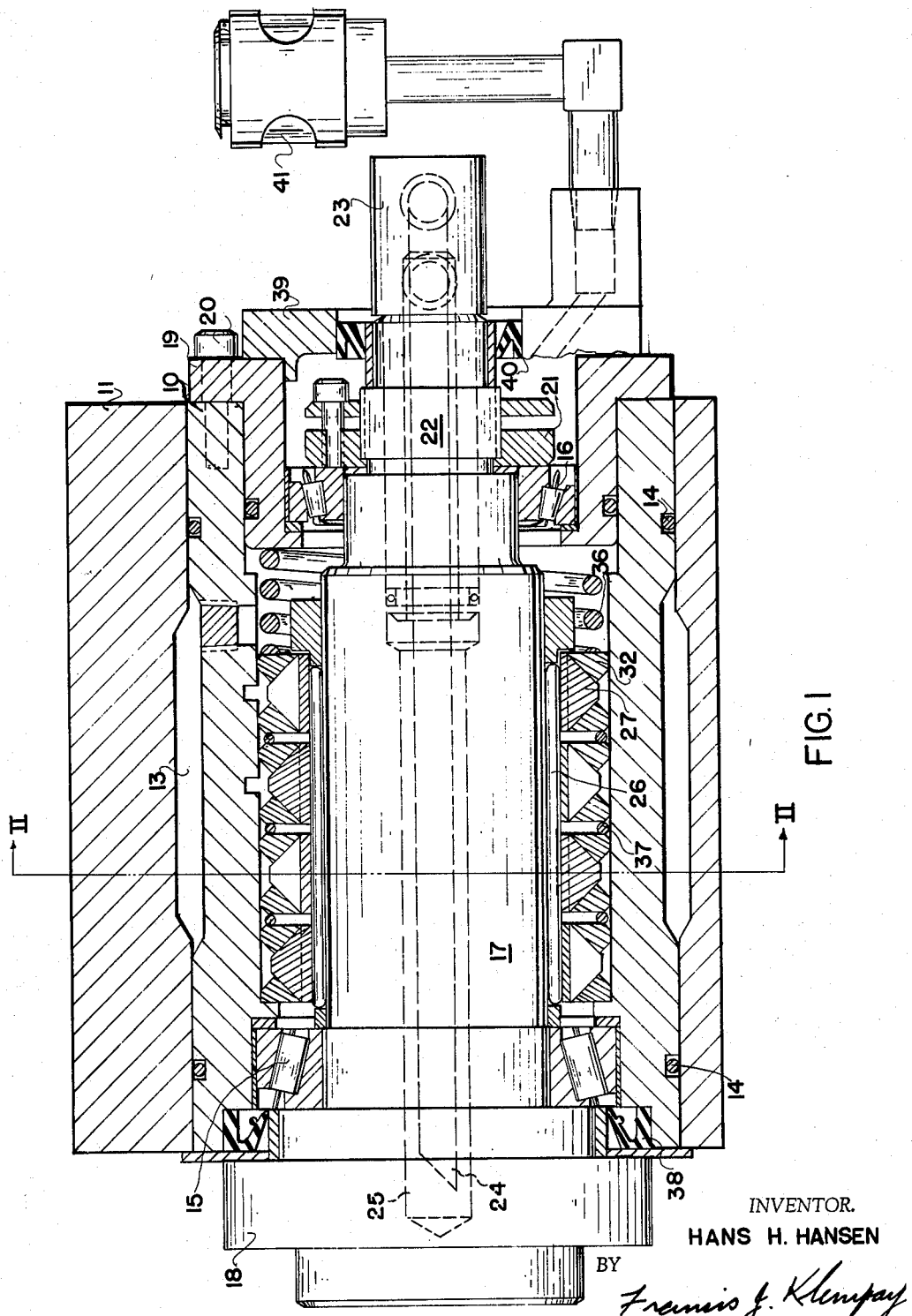
FIGURE 1 is a longitudinal section through a rotary current transfer device constructed in accordance with the the principles of my invention.

The current transfer device herein illustrated is of the cartridge type, i.e., being entirely contained in and on a sleeve 10 which is receivable in a bore formed in a machine part 11. Both parts 10 and 11 are made of suitable material having low electrical resistance for the efficient transfer of welding current, for example. A transformer secondary, not shown, may be connected directly to the part 11, and this part is slotted as at 12 whereby the bore therein may be contracted to tightly grip the sleeve 10. The central portion of the bore in part 11 and of the outer periphery of the sleeve 10 is recessed to provide an annular space 13 for the flow of cooling fluid, and O-rings 14 positioned axially outward of this recess are provided to make fluid-tight joints.

Rotatably mounted within the sleeve 10 on spaced anti-friction bearings 15 and 16 is a spindle 17 having an outer shoulder 18 to which a disc-like rotary electrode may be rigidly attached. The outer race of bearing 15 is insulatedly received in a recess formed directly in the sleeve 10. The outer race of the bearing 15 is received in a shouldered bore formed in a ring 19 which is detachably secured to one end of the sleeve 10 by means of the cap screws 20. As shown, the bearings 15, 16 are of the tapered roller type, oppositely disposed, and are adapted to be adjusted by a locking nut 21 which is adjustably mounted on a portion 22 of the spindle 17 and which bears against the inner race of the bearing 16.

In accordance with usual practice, a fitting 23 having inlet and outlet ports is swiveled on the end of the spindle 17 opposite the electrode-mounting end thereof, and this fitting carries a tube 24 which fits concentrically within a blind bore 25 formed in the spindle 17. This structure provides for the internal cooling of the spindle 17 as will be understood by those skilled in the art.

Figure 2:
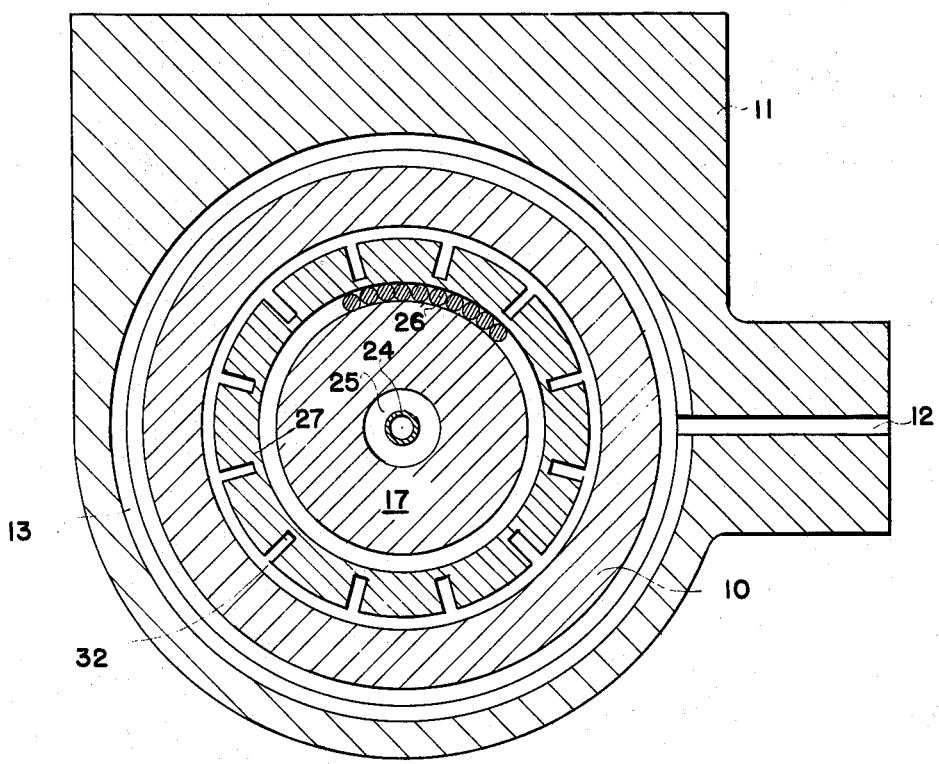
FIGURE 2 is a transverse section taken along the line II—II of FIGURE 1.

The central portion of the spindle 17 is accurately machined to provide a cylindrical peripheral surface intermediate the bearings 15 and 16 and very accurately concentric with these bearings. Overlying this cylindrical surface is a multiplicity of circumferentially distributed but axially extending needle-like rollers 26. These rollers are preferably made of a silver alloy for high electrical conductivity, but as is apparent from FIGURE 2 they have substantially only line contact with the outer periphery of the spindle 17. As explained above, in order for the device to transmit maximum current with minimum friction and minimum deterioration and wear, it is necessary that this linear contact be maintained throughout the length of each roller, and in order to keep the resistance of the linear interconnections to a reasonably low value it is necessary that the linear interconnections be slightly pressure loaded throughout their entire lengths. The manner in which all this is accomplished by the present invention will now be described.

Figures 3, 4, 5, 6:
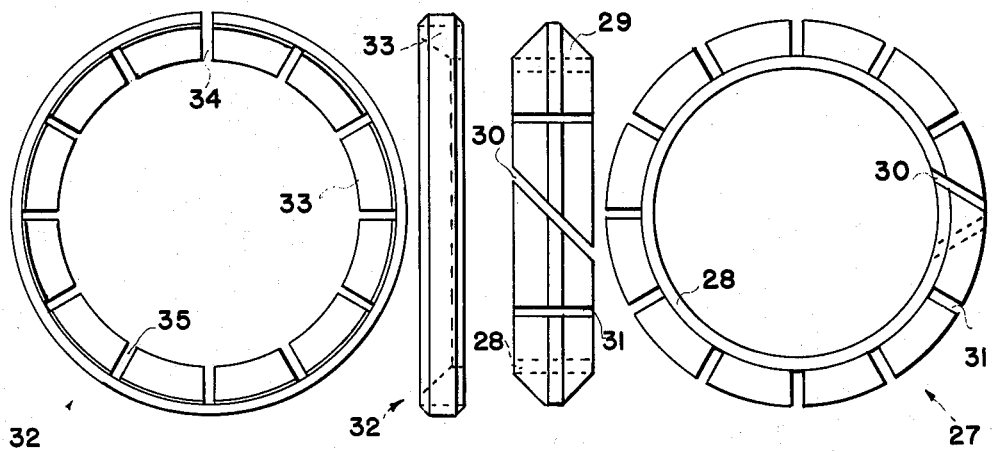
FIGURES 3 and 4 are side and end elevations, respectively, of one of the contact rings utilized in the assembly of FIGURE 1.
FIGURES 5 and 6 are side and end elevations of one of the needle-retaining rings utilized in the assembly of FIGURE 1.

In the specific embodiment illustrated, the rollers 26 are caged and in contact with a plurality of axially spaced rings 27 which are shown more in detail in FIGURES 5 and 6 of the drawing. These rings, of course, are formed of suitable metal, preferably a copper alloy, having low electrical resistance, some resiliency, and adequate wearing qualities particularly as regards the rolling action of the rollers 26. As shown in FIGURES 5 and 6, the rings 27 each have an inner cylindrical surface 28 to bear against the rollers 27 and inwardly tapering side walls 29 to provide angular wedging surfaces for a purpose to be described. The ring 27 is saw-cut at one point as shown at 30 so that the ring is thus made to be free to expand and contract. To assist in this latter feature while yet providing the angular surfaces 29 of appreciable area, the outer section of the ring is longitudinally slotted at a multiplicity of points 31 as shown in FIGURE 5. Further, the saw cut 30 is on a sharp bias as shown in FIGURE 6 so that only a small portion of the rollers 27 will be unsupported by the cylindrical surface 28 of the ring.

Adapted to overlie each of the annular surfaces 29 and snugly received within the bore of sleeve 10 are a plurality of current-conductive rings 32, one of which is shown more clearly in FIGURES 3 and 4, and which are constructed of material like that used for the rings 27. The inner surfaces of the rings 32 are angled as at 33 complementary to the angled side edges of the rings 27 so that full contact will be maintained between the interengaging surfaces for the efficient and equally distributed passage of current from the rings 32 to the rings 27. The rings 32 are each saw-cut at one point as shown at 34 whereby the rings are free to expand and contract, and to assist in this action the radially inner sections of these rings are longitudinally slotted at a multiplicity of circumferentially spaced points as indicated at 35 in FIGURE 3.

By referring to FIGURE 1, it will be noted that one of the rings 32 is provided for each side of each of the rings 27, and that these three parts together with rollers 26 interposed between the center ring 27 and the spindle 17 may be considered as a complete current collector or transfer assembly. Design considerations may dictate that only one or a predetermined number of such assemblies be employed in any particular current transfer device, and these assemblies may be made in varying axial lengths. I prefer, however, that the axial lengths of these current collector assemblies be kept rather short and that a multiplicity of such assemblies be employed in any one unit, all as shown in FIGURE 1. In this manner the current conductor rollers 27 are acted on in a larger number of axially spaced planes so that the rollers are maintained in pressure rolling contact with both the spindle and the inner cylindrical surfaces 28 of the rings 27 throughout substantially the whole of their lengths.

Due to the angularity or wedging action of the interengagement between any ring 27 and its associated rings 32 axial pressure applied tending to bring these contact rings together will, of course, expand the rings 32 into pressure engagement with the bore in sleeve 10 and to contract the ring 27 into pressure engagement with the rollers 26. There is thus established a tight conductive interconnection from the sleeve 10 through the rings 32, and thence through ring 27, rollers 26 and spindle 17 in sequence to provide an efficient current conductive path. This inward biasing of the rings 32 is accomplished by the axially acting coil spring 36 which is of the expansion type—having one end abutted against the adjacent one of the rings 32 and having its other end bearing against the inner end of the bearing retaining ring 19.

When a plurality of the above outlined current collector assemblies are used in the unit, it is highly desirable that each assembly have independent action and with each assembly exerting the same contractive force on the retaining rollers. To accomplish this, I separate the assemblies by spacing them slightly in an axial direction and position a yieldable O-ring or other coaxially compressible ring in the interstices between the assemblies. Such O-rings are shown at 37 in FIGURE 1. These rings may be considered as axially compressible separators and they have the effect of equalizing the axial thrust imposed on the rings 32 of the respective collector assemblies. This is so because the reaction of the ring 37 closest to the spring 36 is exactly equal to the force of the spring, and the reactive force is, of course, transmitted to the second or next collector assembly and so on down the line.

The electrode end of the sleeve 10 is recessed to receive an oil seal 38 while the other end of the sleeve 10 is closed by the ring 19 and a cover plate 39 bearing a second oil seal 40. Thus, the space within the sleeve 10 surrounding the bearings and all the current collector assemblies is totally enclosed, and in accordance with usual practice this enclosed space is filled with a suitable lubricating oil the level of which may be checked by an interconnected sight glass 41.

It should now be apparent that I have provided an improved rotary current transfer device which accomplishes the objects initially set out above. The overall assembly is most efficient in current transfer capacity and characteristics while yet the resistance to rotation imposed on the spindle is kept to a minimum. The rollers 26, aside from their current carrying function also collectively act as a low-friction needle bearing which reduces the size, loading, and friction of the bearings 15 and 16. Since the needle-like rolls 26 are uniformly loaded throughout their entire length, maximum line contact for the transmission of current is maintained, and the pressure-loading on these rollers may be rather light since the construction of the overall unit automatically compensates for minor inaccuracies in manufacture and for normal wear of the parts.

An important feature of the invention is that the diameter of the spindle 17 may be kept rather large in proportion to the internal and external diameters of the cartridge sleeve 10 to lend rigidity to the spindle and to permit the use of a very large number of needle-like rollers 26 to further distribute the current and reduce the current density across any increment of the substantial line contact between the rollers and rings 27 or spindle 17. If desired, suitable expedients, not shown, may be employed to vary the compression of the spring 36 and thus the loading on the rollers 26. Also, it should be apparent that specific means other than the spring 36 may be used to apply axially compressive forces to the current collector assemblies above outlined, and in the event that a plurality of such assemblies are utilized with yieldable rings therebetween the magnitude of the axial pressure may be controlled by simply moving an end ring 32 by screw means or otherwise. I also contemplate that in certain applications the rollers 26 may be dispensed with entirely whereby the inner peripheries or cylindrical surfaces 28 of the rings 27 would ride directly on the spindle. Further, it should be understood that the rings which bear on the rollers or on the spindles and the current-conductive rings which engage the bore of the fixed terminal or sleeve may be simply reversed or made in other configurations and yet accomplish the results of this invention. The essence of this invention is the general idea of using expansible and contractible collet type of split current-conductive rings between the bore of the fixed terminal or sleeve and the rotating current-conductive spindle to transfer current.

Various other changes in specific design will readily occur to anyone skilled in the art, and reference should accordingly be had to the appended claims in determining the scope of the invention.

I claim:

1. Apparatus for transmitting high amperage current from a current-conductive sleeve having a bore therein to a current-conductive spindle rotatably supported in said bore comprising insulated anti-friction bearings received in the end portions of said bore and journaling said spindle therein, a plurality of highly conductive needle-like rollers positioned parallel to the axis of rotation of said spindle and in electrical contact with the surface of said spindle, needle-retaining rings having outside diameters less than that of said bore and inside diameters sufficient to keep said needle-like rollers in rolling contact with the spindle and with said needle-retaining rings, the outer side edges of said needle-retaining rings having wedge-shaped surfaces, current-conductive rings on either side of said needle-retaining rings and having angular surfaces in contact with the wedge-shaped surfaces of said needle-retaining rings, said current-conductive rings having their outer peripheries in contact with the bore in said sleeve, said needle-engaging rings being axially spaced from each other, both said needle-retaining rings and said current-conductive rings being cut radially through their radial dimensions to permit expansion and contraction thereof, means for applying axial pressure to said current-conductive rings whereby said intercontacting angular surfaces cause said needle-retaining rings to contract and thus to press the needle-like rollers against said spindle thereby compensating for irregularities in said spindle and insuring full engagement between each roller and the spindle.

2. Apparatus according to claim 1 further characterized in that both the needle-retaining rings and the current-conductive rings have a plurality of circumferentially spaced radial slots extending partially through them to allow for further expansion and contraction of said rings.

3. Apparatus according to claim 1 further characterized in that the radial cross section of said needle-retaining rings is such as to provide an angular surface on at least one side of each of said needle-retaining rings, one of said current-conductive rings being individual to each of said wedge-shaped surfaces on said needle-retaining rings, and axially yieldable ring-like means between each adjacent pair of current-conductive rings.

4. Apparatus according to claim 1 further characterized in that said means for applying axial pressure comprises a coil spring received within said bore and having one of its ends fixed against outward axial movement in said bore and the other of its ends abutted against one of said current-conductive rings.

5. Apparatus for transmitting high amperage current from a current-conductive sleeve having a bore therein to a current-conductive spindle rotatably supported in said bore comprising an axially spaced pair of current-conductive rings snugly received in said bore, said rings being each completely cut through radially at one point to allow expansion and contraction of them, the inner surfaces of said rings being angled convergently toward each other, a third current-conductive ring positioned between said pair of rings and having outer angled surfaces lying in contact with the angled inner surfaces of said pair of rings, said third ring being also completely cut through radially at one point to allow expansion and contraction thereof, said third ring having a cylindrical inner surface, current-conductive needles positioned between the outer periphery of said spindle and said cylindrical surface and lying parallel with the axis of rotation of said spindle; and means to apply resilient axial pressure to said pair of rings whereby said pair of rings are urged toward each other to expand said pair of rings into pressure contact with the wall of said bore, to apply pressure contact between all of said angled surfaces, and to contract said third ring whereby said needles are pressure-loaded between said cylindrical surfaces and said outer periphery of the spindle.

6. Apparatus for transmitting high amperage current between a current-conductive member having a bore therein and a current-conductive spindle rotatably supported in said bore for rotation about the longitudinal axis of said bore comprising a current-conductive split ring having a cylindrical inner surface disposed toward said spindle, a second current conductive split ring having a cylindrical outer surface adapted to be snugly received in said bore, said rings having interengaging annular wedge surfaces whereby upon axial displacement of one of said rings with respect to the other of said rings said first mentioned ring will be contracted and said second ring will be expanded into tighter engagement with said bore, and means to apply resilient axial pressure to said one of said rings.

7. Apparatus according to claim 6 further including a multiplicity of needle-like current-conductive rollers positioned radially between said spindle and the cylindrical inner surface of the first mentioned ring but extending parallel with said axis.

8. Apparatus according to claim 6 further characterized in that said first mentioned and said second rings constitute a current collector assembly, and further including a plurality of such assemblies disposed between said bore and spindle in longitudinally spaced relation, and axially yieldable rings interposed between said assemblies whereby the contractive force applied to the first mentioned ring of each assembly will be uniform.

References Cited by the Examiner

UNITED STATES PATENTS

| | | | |
|---|---|---|---|
| 1,241,770 | 10/17 | Saxton | 277—145 |
| 2,716,223 | 8/55 | Griefen | 339—5 |
| 2,931,671 | 4/60 | Beeley | 277—145 X |
| 3,021,497 | 2/62 | Riley | 339—5 |

JOSEPH D. SEERS, *Primary Examiner.*

ALFRED S. TRASK, *Examiner.*